(12) United States Patent
Kato et al.

(10) Patent No.: US 6,423,814 B1
(45) Date of Patent: Jul. 23, 2002

(54) POLYESTER RESIN COMPOSITION

(75) Inventors: Jinichiro Kato; Katsuhiro Fujimoto; Tetsuko Takahashi, all of Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/463,846

(22) PCT Filed: Sep. 3, 1998

(86) PCT No.: PCT/JP98/03959
§ 371 (c)(1),
(2), (4) Date: Feb. 1, 2000

(87) PCT Pub. No.: WO99/11709
PCT Pub. Date: Mar. 11, 1999

(30) Foreign Application Priority Data

Sep. 3, 1997 (JP) .............................................. 9-252686

(51) Int. Cl.$^7$ ......................... C08G 63/02; C08G 63/78
(52) U.S. Cl. ...................... 528/272; 528/280; 528/286; 528/301; 528/307; 528/308.6; 524/706; 524/710; 524/785
(58) Field of Search .............................. 528/272, 280, 528/286, 301, 307, 308.6; 524/706, 710, 785

(56) References Cited

U.S. PATENT DOCUMENTS

| | | | | |
|---|---|---|---|---|
| 4,990,594 A | | 2/1991 | Cooke et al. | 528/272 |
| 5,019,640 A | | 5/1991 | Engel-Badar et al. | 528/272 |
| 5,340,909 A | | 8/1994 | Doerr et al. | 528/276 |
| 5,798,433 A | | 8/1998 | Schmidt et al. | 528/279 |
| 6,284,370 B1 | * | 9/2001 | Fujimoto et al. | 428/364 |
| 6,316,101 B2 | * | 11/2001 | Kato et al. | 428/364 |

FOREIGN PATENT DOCUMENTS

| EP | 0 399 799 A2 | 11/1990 |
|---|---|---|
| GB | 1 522 656 | 8/1978 |
| JP | 51-68489 | 6/1976 |
| JP | 2-24123 | 1/1990 |
| JP | 6-41287 | 3/1990 |
| JP | 4-279633 | 10/1992 |
| JP | 5-262862 | 10/1993 |
| JP | 6-42187 | 2/1994 |
| JP | 8-73581 | 3/1996 |
| JP | 8-120521 | 5/1996 |
| JP | 8-311177 | 11/1996 |
| WO | WO 98/23662 | 4/1998 |
| WO | WO 98/236662 | 6/1998 |

OTHER PUBLICATIONS

S. Schauhoff, Degussa AG, Hanau/D, W. Schmidt, Zimmer AG, Frankfurt/D, "New Developments in the production of polytrimethylene terephthalate (PTT)", Chemical Fibers International, vol. 46, Sep. 1996, pp. 263–264.

"Synthesis and properties of fiber–grade poly(trimethylene terephthalate)," H. L. Traub et al., Angewandte Makromolekulare Chemie, Applied Macromolecular Chemistry and Physics, vol. 230, Aug. 1,1995, pp. 179–187.

"Cyclische Oligomere in Polyestern aus Diolen und aromatischen Dicarbonsäuren," Gottfried Wick et al., Die Angewandte Makromolekulare Chemie, vol. 112, 1983, pp. 59–94.

Derwent Publications Ltd., London, GB, XPOO2153414 & JP 51 142098 A (Teijin Ltd.), Dec. 6, 1976.

* cited by examiner

*Primary Examiner*—Samuel A. Acquah
(74) *Attorney, Agent, or Firm*—Finnegan, Henderson, Farabow, Garrett & Dunner, L.L.P.

(57) ABSTRACT

A polyester resin composition is disclosed, comprising poly (trimethylene terephthalate) in a proportion of 90 wt % or more, wherein the resin composition has an intrinsic viscosity of from 0.4 to 2 and contains a phosphorus compound corresponding to from 10 to 250 ppm in terms of the amount of phosphorus element, a cyclic dimer in an amount of not exceeding 3 wt % and a bis(3-hydroxypropyl)ether in an amount of 2 wt % or less. This polyester resin composition has excellent spinning stability and high melt stability and is used for the production of a poly(trimethylene terephthalate)-based fiber having excellent whiteness and high tenacity.

8 Claims, No Drawings

POLYESTER RESIN COMPOSITION

TECHNICAL FIELD

The present invention relates to a polyester resin composition having high whiteness, good spinning stability and excellent melt stability. More specifically, the present invention relates to a resin composition comprising poly(trimethylene terephthalate) which itself has high whiteness, good spinning stability and excellent melt stability, therefore, scarcely causes discoloration of the resin composition or reduction in the molecular weight due to thermal decomposition at the melt spinning stage and in turn facilitates the production of a fiber having high tenacity.

BACKGROUND ART

The poly(trimethylene terephthalate) fiber is an epoch-making fiber having soft touch attributable to the low modulus, properties analogous to a nylon fiber such as excellent elastic recovery or easy dyeability, and properties analogous to a poly(ethylene terephthalate) fiber, such as wash-and-wear property, dimensional stability and good color fastness, all at the same time. By using these characteristic features, application of poly(trimethylene terephthalate) fiber to clothing, carpets and the like is proceeding.

Poly(trimethylene terephthalate) can be polymerized by the same method as used for poly(ethylene terephthalate) or poly(butylene terephthalate) analogous to poly(trimethylene terephthalate) in chemical structure. More specifically, terephthalic acid or a lower alcohol diester of terephthalic acid, such as dimethyl terephthalate, and a trimethylene glycol (also called 1,3-propanediol) are previously subjected to an ester exchange reaction shown by the following formula (1) while heating in the absence or presence of a catalyst such as a metal carboxylate, titanium alkoxide or an organic acid, and then to a polycondensation reaction shown by the following formula (2) using a catalyst such as titanium alkoxide or an antimony oxide:

  (1)

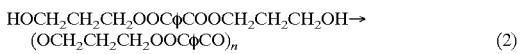  (2)

(wherein R represents hydrogen or methyl group and φ represents a benzene ring bonded at the para-position).

However, the polymerization of poly(trimethylene terephthalate) encounters technical difficulties unlike poly(ethylene terephthalate) or poly(butylene terephthalate), and various problems are left to be overcome. To be brief, the technical difficulties to be overcome are the following three problems, namely, whiteness, spinning stability and melt stability.

The problem in the whiteness is the coloration of polymer to yellow at the polymerization stage, which incurs coloration of the fiber or cloth obtained and impairs the commercial performance. More specifically, the fields of inner wear, panty stocking, sportswear, outer wear and the like are considered to be particularly promising for making use of soft touch, excellent elastic recovery and easy care property of the poly(trimethylene terephthalate) fiber. In order to find a way into these commercial fields, the fiber must have sufficiently high whiteness, so that all dyed products of from light to heavy shades can form a brilliant color. However, the poly(trimethylene terephthalate) is readily colored at the stage of polymerization and even if a dyed fiber or cloth is produced using such a polymer, the dyed product is deficient in the color brilliancy and the commercial value is seriously impaired.

The problem in spinning stability is the adverse effect of many impurities contained in the polymer on the spinning stability. More specifically, in the polymerization step of poly(trimethylene terephthalate), a cyclic dimer or other cyclic or linear oligomers are produced in a large amount and these precipitate in the periphery of spinneret at the spinning to disadvantageously increase the frequency of yarn breaking or cleaning of the spinneret (called wiping cycle). In particular, the cyclic dimer is produced in a large amount and mainly gives rise to the above-described troubles.

The problem in the melt stability is the reduction in molecular weight of the polymer or the coloration of polymer at the melting due to poor thermal stability of the melted polymer. In particular, the easy occurrence of reduction in the molecular weight means that even if the molecular weight is high at the polymer stage, the molecular weight decreases at the stage of melt spinning. If such a phenomenon takes place, the fiber obtained can hardly have high tenacity. This adversely affects the fundamental performance of commercial product, such as a reduction in the tearing strength or bursting strength of the fabric obtained.

Conventional techniques are described below, however, there is no case where all of these three technical problems are overcome and a poly(ethylene terephthalate) fiber favored with excellent whiteness, easy production in industry and sufficiently high tenacity is obtained.

For improving the whiteness or spinnability of poly(trimethylene terephthalate), several methods are known.

For example, Japanese Unexamined Patent Publication (Kokai) No. 5-262862 discloses a technique of using a tin catalyst as the polymerization catalyst for improving the whiteness. However, according to studies by the present inventors, the whiteness is rather poorer than in the case of using titanium alkoxide as the catalyst, though the polymerization rate is very high when a tin catalyst is used. Also, zinc acetate and a tin catalyst are used as the ester exchange catalyst and the polycondensation catalyst, respectively. However, if only melt polymerization is performed using such a combination without passing through solid phase polymerization, the amount of cyclic dimer exceeds 3 wt % and the spinning stability is bad. Furthermore, in the Examples of this prior art, tridecyl phosphate is allowed to be present in an amount of at most 500 ppm during the polymerization. However, if such a compound having a long chain is present together, there arise problems such as bubbling at the dyeing state or easy occurrence of spotted dyeing. Moreover, if a tin catalyst or tridecyl phosphate is used, the fiber obtained is low in tenacity and can hardly have a tenacity of 3.5 g/d or more.

In addition, for improving the whiteness, use of a titanium catalyst as the ester exchange reaction catalyst and an antimony catalyst as the polycondensation catalyst has been proposed (see, Chemical, Fiber International, Vol. 45, pp. 263–264 (1996)). In this publication, formation of by-products is also referred to and it is stated that depending on the case, 3% or more of oligomer is contained in poly(trimethylene terephthalate) and these impurities cause problems in the spinning process or dyeing process. However, according to studies by the present inventors, when an antimony catalyst is used, the polymerization rate is reduced, therefore, the polymer is exposed at a high temperature for a longer time and the whiteness rather decreases. Furthermore, even in this publication, means for reducing the amount of cyclic dimer or improving the melt stability of polymer is not specifically described by any means.

As means for achieving improvement in the whiteness of poly(trimethylene terephthalate) and reduction of oligomer, Japanese Unexamined Patent Publication (Kokai) No. 8-311177 discloses a poly(trimethylene terephthalate) resin having an intrinsic viscosity of 0.9 or more, a 'b' value as an index for showing the degree of yellowing of chip of 10 or less and an oligomer content of 1 wt % or more, where the poly(trimethylene terephthalate) obtained by an ordinary manner is subjected to solid phase polymerization at a temperature of approximately from 190 to 200° C. under reduced pressure so as to reduce the production of white powder on the metal face or in the vicinity of spinneret at the spinning process and prevent yarn breaking. In the Examples of this prior art, a terephthalic acid and 1,3-propanediol are ester exchanged in the absence of a catalyst without using a phosphorus compound or a cobalt compound, thereafter, tetrabutyl titanate (titanium butoxide) is added thereto to prepare a prepolymer having an intrinsic viscosity of 0.70 and the prepolymer is then subjected to solid phase polymerization to obtain a polymer having an intrinsic viscosity of 1.02. However, if such a polymer is melted, thermal decomposition abruptly occurs and the molecular weight decreases. Accordingly, even if a fiber is produced using the polymer having a high polymerization degree obtained by this known method, the viscosity decreases at the stage of spinning and a fiber having sufficiently high tenacity cannot be obtained.

International Patent Publication (WO) 9823662 discloses poly(trimethylene terephthalate) and a production method thereof, where the poly(trimethylene terephthalate) is terminally masked by the hindered phenol moiety so as to reduce the amount of acrolein generated at the heating in air. In this prior art, an ester-forming monofunctional dicarboxylic acid having a terephthalic acid, trimethylene glycol and a hindered phenol moiety are ester exchanged in the presence of a triphenyl phosphite-base stabilizer under high pressure and thereafter polycondensed to obtain a polymer. However, the triphenyl phosphite-type stabilizer used here is highly subliming and partially sublimes at the stage of polycondensation reaction performed at a high temperature under vacuum, and the amount of each element in the polymer obtained departs from the range specified in the present invention. As a result, the polymer obtained has low melt stability and a fiber having high tenacity is difficult to obtain. Of course, the adverse effect on the tenacity of fiber ascribable to the melt stability is not suggested at all. Furthermore, in this prior art, it is stated that bis(3-hydroxypropyl)ether is contained in the polymer in an amount of about 4 mol % (in excess of 2 wt % in terms of % by weight), however, such a polymer is seriously reduced in the melt stability or color fastness to light and therefore, it cannot be used for clothing. In addition, according to this known technique, the ester exchange reaction is performed under high pressure, therefore, the experimental polymerization may be easily performed but in the industrial scale, a tremendously large equipment capable of withstanding the high pressure is necessary and this is highly disadvantageous in view of profitability.

DISCLOSURE OF THE INVENTION

One object of the present invention is to provide a poly(trimethylene terephthalate) resin composition having by itself excellent whiteness and reduced in the coloration at the stage of spinning.

Another object of the present invention is to provide a poly(trimethylene terephthalate) resin composition further having excellent spinning stability and high melt stability and being unable to cause reduction in the molecular weight due to thermal decomposition in the melt spinning process.

Still another object of the present invention is specifically to provide a poly(trimethylene terephthalate) resin composition capable of producing a poly(trimethylene terephthalate)-base fiber having high whiteness and high tenacity.

As a result of extensive research on the method for producing poly(trimethylene terephthalate) having by itself excellent whiteness, reduced in the coloration at the stage of spinning and at the same time, and easy to provide high tenacity, the present inventors have succeeded in obtaining poly(trimethylene terephthalate) having an appropriate viscosity and reduced in the amounts of impurities having adverse effect on the improvement of whiteness and the spinning stability or melt stability by adding a phosphorus compound and optimizing the polymerization conditions. Thus, the present invention has been accomplished.

The present invention is a polyester resin composition having an intrinsic viscosity of from 0.4 to 2 and satisfying the following conditions (1) to (4):

(1) poly(trimethylene terephthalate) occupies 90 wt % or more;

(2) a phosphorus compound corresponding to from 10 to 250 ppm in terms of the amount of phosphorus element is contained;

(3) 3 wt % or less of cyclic dimer is contained; and (4) 2 wt % or less of bis(3-hydroxypropyl)ether is contained and copolymerized with poly(trimethylene terephthalate).

The polyester resin composition of the present invention is a polyester resin composition comprising poly (trimethylene terephthalate) in an amount of at least 90 wt % based on the weight of the resin composition. The term "poly(trimethylene terephthalate)" as used herein means a polyester consisting of a terephthalic acid as the acid component and a trimethylene glycol (also called 1,3-propanediol) as the diol component.

In the composition, the poly(trimethylene terephthalate) as a composition component may contain another copolymerizing component in an amount of 10 wt % or less based on the weight of the resin composition. Examples of the copolymerizing composition include ester-forming monomers such as 5-sodium sulfoisophthalate, 5-potassium sulfoisophthalate, 4-sodium sulfo-2,6-naphthalenedicaboxylate, tetramethylphosphonium 3,5-dicarboxybenene sulfonate, tetrabutylphosphonium 3,5-dicarboxybenzene sulfonate, tributylmethylphosphonium 3,5-dicarboxybenzene sulfonate, tetrabutylphosphonium 2,6-dicarboxynaphthalene-4-sulfonate, tetramethylphosphonium 2,6-dicarboxynaphthalene-4-sulfonate, ammonium 3,5-dicarboxybenzene sulfonate, 1,2-butane diol, 1,3-butane diol, 1,4-butane diol, neopentyl glycol, 1,5-pentamethylene glycol, 1,6-hexamethylene glycol, heptamethylene glycol, octamethylene glycol, decamethylene glycol, dodecamethylene glycol, 1,4-cyclohexane diol, 1,3-cyclohexane diol, 1,2-cyclohexane diol, 1,4-cyclohexane dimethanol, 1,3-cyclohexane dimethanol, 1,2-cyclohexane dimethanol, oxalic acid, malonic acid, succinic acid, glutaric acid, adipic acid, heptanoic diacid, octanoic diacid, sebacic acid, dodecanoic diacid, 2-methylglutaric acid, 2-methyladipic acid, fumaric acid, maleic acid, itaconic acid, 1,4-cyclohexanedicarboxylic acid, 1,3-cyclohexnedicarboxylic acid and 1,2-cyclohexanedicarboxylic acid.

The polyester resin composition of the present invention must have an intrinsic viscosity [η] of from 0.4 to 2.0. If the intrinsic viscosity is less than 0.4, the fiber obtained has low tenacity due to excessively low polymerization degree and the spinnability becomes unstable, whereas if the intrinsic viscosity exceeds 2.0, the melt viscosity is excessively high, as a result, weighing in the gear pump cannot be smoothly performed and the spinnability decreases due to ejection failure or the like. The intrinsic viscosity is preferably from 0.6 to 1.5, more preferably from 0.6 to 1.4. With the intrinsic viscosity in this range, a poly(trimethylene terephthalate)-based fiber having high tenacity and excellent spinnability may be obtained.

The polyester resin composition of the present invention must contain a phosphorus compound corresponding to from 10 to 250 ppm in terms of the amount of phosphorus element. To obtain a cloth product after polymerization, the polymer passes through the steps of melt polymerization, solid phase polymerization, chip drying at a high temperature, melt spinning, scouring, heatsetting, dyeing and the like. The phosphorus compound exerts a very great effect on the prevention of coloring or the improvement of melt stability at respective stages.

The phosphorus compound is described in detail below.

Unlike poly(ethylene terephthalate) or poly(butylene terephthalate) commonly used for clothing in general, the poly(trimethylene terephthalate) is readily colored yellow at the melt polymerization, drying or melt spinning. The phosphorus compound is particularly effective in inhibiting the discoloration. Furthermore, the poly(trimethylene terephthalate) has low melt stability and therefore, the polymerization degree is liable to decrease. Even if a polymer having a high intrinsic viscosity is spun, the fiber obtained cannot have sufficiently high tenacity due to reduction in the polymerization degree. The phosphorus compound also has a great effect of preventing the reduction in the viscosity of polymer.

The phosphorus compound is preferably an organic phosphorus compound. From the standpoint of giving excellent effect on the prevention of discoloring or the melt stability and having no adverse effect on the spinnability, a phosphate represented by the formula; $O=P(OR_1)(OR_2)(OR_3)$, and a phosphite represented by the formula: $P(OR_4)(OR_5)(OR_6)$ are more preferred. In particular, those where $R_1$, $R_2$, $R_3$, $R_4$, $R_5$, and $R_6$, which may be the same or different, each is selected from the group consisting of hydrogen atom, an organic group having from 1 to 8 carbon atoms, an alkali metal and an alkaline earth metal, are still more preferred.

In the formulae, if $R_1$, $R_2R_3$, $R_4$, $R_5$ and $R_6$ each has 9 or more carbon atoms, bubbling may occur at the stage of dyeing and therefore, spotted dyeing is readily caused or the tenacity is disadvantageously difficult to increase. Furthermore, out of $R_1$, $R_2$, $R_3$, $R_4$, $R_5$ and $R_6$, one alkoxy group of the phosphorus compound is preferably a hydrogen atom or an alkyl group having from 1 to 8 carbon atoms. This is because these alkoxy groups each undertakes ester exchange with trimethylene glycol and converts into a form easily dispersible in the polymer. The phosphorus compound thus dispersed in the molecular order has high effect particularly on the prevention of coloring and the improvement of melt stability. On the other hand, if $R_1$, $R_2$, $R_3$, $R_4$, $R_5$ and $R_6$ all are a phenoxy group or the hydrogen atoms on the benzene ring are partly or wholly displaced, the each group hardly undertakes ester exchange with trimethylene glycol and scarcely causes dispersion in the molecular order or because of its sublimability, the group is liable to dissipate out of the system during the polymerization to decrease the effect of preventing the discoloration or improving the melt stability. Accordingly, in the preferred embodiment of phosphorus compound, at least one alkoxy group is preferably hydrogen atom, an alkyl group having from 1 to 8 carbon atoms, an alkali metal or an alkaline earth metal. The phosphorus compound is particularly preferably a phosphate represented by the formula: $O=P(OR_1)$ $(OR_2)$ $(OR_3)$, because a phosphite represented by the formula: $P(OR_4)$ $(OR_5)$ $(OR_6)$ has a tendency to slightly inhibit the polymerization.

Specific preferred examples of the phosphorus compound include phosphoric acid, trimethyl phosphate, triethyl phosphate, tripropyl phosphate, tributyl phosphate, tripentyl phosphate, trihexyl phosphate, triheptyl phosphate, trioctyl phosphate, dimethylethyl phosphate, dimethyl phosphate, methyl phosphate, 3-hydroxypropyl phosphate, bis(3-hydroxypropyl)phosphate, tris(3-hydroxyproyl)phosphate, triphenyl phosphate, phosphorous acid, trimethyl phosphite, triethyl phosphite, tripropyl phosphite, tributyl phosphite, tripentyl phosphite, trihexyl phosphite, triheptyl phosphite, trioctyl phosphite, dimethylethyl phosphite, dimethyl phosphite, methyl phosphite, 3-hydroxypropyl phosphite, bis(3-hydroxypropyl)phosphite, tris(3-hydroxypropyl) phosphite, triphenyl phosphite, sodium phosphate, potassium phosphate, magnesium phosphate, calcium phosphate, dimethylsodium phosphate and methyldisodium phosphate. In view of excellent effect on the prevention of coloring or the melt stability or high capability of preventing polymerization, phosphoric acid, trimethyl phosphate, triethyl phosphate and tripropyl phosphate are more preferred.

The amount of phosphorus compound contained in the resin composition may be expressed by the weight percentage of the phosphorus element contained in the resin composition. The amount of phosphorus compound must be from 10 to 250 ppm. If the amount of phosphorus compound contained is less than 10 ppm, the effect of preventing discoloration or preventing reduction in the viscosity may not be satisfactorily brought out, whereas if it exceeds 250 ppm, these effects may be satisfactorily obtained, however, the polymerization catalyst is partially deactivated and the melt polymerization or solid phase polymerization is prevented from smoothly proceeding. The amount of phosphorus compound is preferably from 35 to 150 ppm, more preferably from 50 to 120 ppm.

Although it is described in detail later, in the polymerization of poly(trimethylene terephthalate), a titanium alkoxide such as titanium butoxide and titanium isopropoxide, or a metal compound such as antimony trioxide is used as the polycondensation catalyst. With respect to the kind of metal element in the metal compound used as the polycondensation catalyst, titanium, tin and antimony are used because of their high activity. The phosphorus compound for use in the present invention sometimes reacts with the polycondensation catalyst to slightly prolong the polymerization time. In order to prevent the prolongation of polymerization time and at the same time to achieve prevention of discoloring or improvement of the melt stability, the ratio of the molar number of phosphorus element in the phosphorus compound to the molar number of metal element used as the polycondensation catalyst is preferably set to be from 0.4 to 3, more preferably from 0.55 to 2.

In the polyester resin composition of the present invention, a cobalt compound is preferably used in combination with the phosphorus compound. This combination use provides a synergistic effect of extremely reducing the discoloration at the melt polymerization, drying or melt spinning. Examples of the cobalt compound include cobalt acetate, cobalt formate, cobalt carbonate, cobalt acetyl acetonate, cobalt sulfate, cobalt chloride, cobalt bromide, cobalt hydroxide, cobalt nitrate and cobalt carbonate. The cobalt compound may be either an anhydride or a hydrate. Among these cobalt compounds, cobalt acetate, cobalt formate, cobalt carbonate, cobalt acetyl acetonate and cobalt sulfate are preferred because of their excellent effect of preventing discoloration.

The amount of cobalt compound contained in the polyester resin composition of the present invention may be expressed by the weight percentage of cobalt element contained in the resin composition and the range thereof is preferably from 5 to 200 ppm. If the amount of cobalt compound is less than 5 ppm, the effect of preventing discoloration may not be satisfactorily brought out, whereas if it exceeds 200 ppm, the polymer may be tinged blue or black. The amount of cobalt compound is preferably from 10 to 150 ppm, more preferably from 10 to 100 ppm.

The amount of cyclic dimer contained in the polyester resin composition of the present invention must be 3 wt % or less based on the weight of resin composition. The cyclic dimer as used herein means a dimer where trimethylene terephthalate units are connected to form a ring. If the content of this oligomer in the resin composition exceeds 3 wt %, the oligomer deposits on the periphery of a spinneret at the a spinning or on the nozzle or guide for an oil agent and, as a result, the wiping cycle is shortened or in the worst case, broken filaments may be generated in yarn or yarn breaking may occur. In order to stably perform the spinning for a long time of 2 weeks or more, the amount of cyclic dimer is preferably 2 wt % or less, more preferably 1 wt % or less.

The amount of bis(3-hydroxypropyl)ether ($HOCH_2CH_2CH_2OCH_2CH_2CH_2OH$, hereinafter simply referred to as "BPE") contained in the polyester resin composition of the present invention must be 2 wt % or less based on the weight of resin composition. BPE is produced by the dimerization of trimethylene glycol as shown in the following formula and copolymerized as it is in the trimethylene terephthalate because BPE has a hydroxyl group at both terminals of the molecule. The amount of BPE produced varies depending on the polymerization catalyst, additives, polymerization temperature, polymerization time or the amount of trimethylene glycol.

$$2HOCH_2CH_2CH_2OH \rightarrow HOCH_2CH_2CH_2OCH_2CH_2CH_2OH$$

Copolymerized BPE has an ether unit having low heat resistance and low color fastness to light, therefore, reduces the melt stability or color fastness to light. If the amount of BPE exceeds 2 wt %, the melt stability seriously decreases and discoloration may occur or the tenacity is liable to decrease.

However, it is found that BPE has not only adverse effect on the resin composition but when the amount of BPE increases, the fiber obtained is improved in the dyeability with a disperse dye. In particular, with the BPE amount of from 0.4 to 1 wt %, normal-pressure dyeability is obtained without greatly reducing the heat resistance or color fastness to light. By virtue of this "atmospheric-pressure dyeability", even when another fiber which deteriorates upon dyeing at a temperature of 100° C. or more, such as polyurethane fiber, wool, silk or acetate fiber, is compounded, the fabric obtained can be dyed under normal pressure. Thus, the dyeability of poly(trimethylene terephthalate) fiber extends over a wide range. Incidentally, this effect is outstanding in the case where the dye concentration is about 4% wt or less.

From these points, the amount of BPE contained in the polyester resin composition of the present invention is preferably 1 wt % or less, more preferably from 0.4 to 1 wt %.

The polyester resin composition of the present invention may contain, if desired, various additives such as a delustering agent, a thermal stabilizer, an antifoaming agent, a color toning agent, a flame retardant, an antioxidant, an ultra-violet absorbing agent, a crystallization nuclear agent and a fluorescent whitening agent, by the copolymerization or mixing.

Particularly, in order to prevent the reduction in the viscosity of the polyester resin composition at the melting or to prevent formation of by product of a low molecular weight material caused by the thermal decomposition of acrolein or allyl alcohol having a strong irritating odor at the drying or heat treatment before the spinning, a hindered phenol-base antioxidant is preferably added. The hindered phenol-base antioxidant may be a known one and examples thereof include pentaerythritol-tetrakis[3-(3,5-di-tert-butyl-4-hydroxyphenyl)propionate], 1,1,3-tris(2-methyl-4-hydroxy-5-tert-butylphenyl)butane, 1,3,5-trimethyl-2,4,6-tris (3,5-di-tert-butyl-4-hydroxybenzyl)benzene, 3,9-bis{2-[3-(3-tert-butyl-4-hydroxy-5-methylphenyl)propionyloxy]-1,1-dimethylethyl}-2,4,8,10tetraoxaspiro[5,5]undecane, 1,3,5-tris(4-tert-butyl-3-hydroxy-2,6-dimethylbenene) isophthalic acid, triethyl glycol-bis[3-(3-tert-butyl-5-methyl-4-hydroxyphenyl)-propionate], 1,6-hexanediol-bis [3-(3,5-di-tert-butyl-4-hydroxyphenyl)propionate], 2,2-thiodiethylene-bis[3-(3,5-di-tert-butyl-4-hydroxyphenyl) propionate] and octadecyl-3-(3,5-di-tert-butyl-4-hydroxyphenyl)propionate]. Among these, pentaerythritoltetrakis[3-(3,5-di-tert-butyl-4-hydroxyphenyl)propionate] is preferred. In this case, the hindered phenol-base oxidization stabilizer may be bonded to poly(trimethylene terephthalate) or may be merely dispersed in the resin composition.

The amount of the hindered phenol-base oxidization stabilizer in the resin composition is preferably 1 wt % or less based on the weight of resin composition. If the amount of hindered phenol-based oxidization stabilizer exceeds 1 wt %, discoloring may occur and even if the hindered phenol-base oxidization stabilizer is added in excess of 1 wt %, the ability of improving the melt stability is saturated. The amount of hindered phenol-base oxidization stabilizer is preferably from 0.02 to 0.5 wt %.

Furthermore, for improving the whiteness, a whitening agent may be used and examples thereof include East Bright produced by Eastman, and Hostapalm pigment described in Japanese Unexamined Patent Publication (Kokai) No. 5-262862. The amount of whitening agent used is preferably 0.5 wt % or less based on the weight of resin composition from the standpoint of whitening effect and colorability of the dyed product.

The production method of the polyester resin composition of the present invention is not particularly limited but the preferred method is roughly classified into the following two methods.

First is a method of using a lower alcohol of terephthalic acid, such as dimethyl terephthalate, and trimethylene glycol as starting materials.

More specifically, a lower alcohol diester of terephthalic acid, such as dimethyl terephthalate, and trimethylene glycol are reacted at a temperature of from 200 to 240° C. to perform ester exchange and thereafter, subjected to polycondensation reaction at a temperature of from 250 to 290° C., preferably from 260 to 280° C., under a reduced pressure of at least 1 torr or less, preferably 0.5 torr or less, to obtain a polymer. Here, the polycondensation reaction temperature is particularly important. If the temperature is higher, the reaction rate is higher but the coloration more readily occurs.

On the other hand, if the polymerization is performed at a temperature lower than 260° C., the amount of cyclic dimer increases. Accordingly, the reaction temperature is preferably selected by taking account of the balance between the reaction rate and the amount of cyclic dimer. The temperature is preferably from 260 to 280° C.

The molar ratio of lower alcohol diester of terephthalic acid to trimethylene glycol as the ester exchange catalyst at the charging is from 1:1.3 to 1:4, preferably from 1:1.5 to 1:2.5. If the trimethylene glycol is less than 1:1.3, the reaction time is extremely prolonged and the polymer is colored, whereas if the amount of trimethylene glycol exceeds 1:4, the amount of BPE produced exceeds 2 wt %.

An ester exchange catalyst must be used. Preferred examples thereof include calcium acetate, magnesium acetate, zinc acetate and titanium acetate. The amount of ester exchange catalyst is preferably from 0.02 to 0.1 wt % based on the terephthalic acid diester used. Manganese acetate also acts as an ester exchange catalyst, however, the amount of cyclic dimer exceeds 3 wt %, therefore, in the case where solid phase polymerization capable of reducing the amount of cyclic dimer as described later is not performed, use of manganese acetate should be avoided.

A polycondensation catalyst must be necessarily used. Examples thereof include titanium alkoxide represented by titanium tetrabutoxide and titanium tetraisopropoxide, antimony acetate and antimony trioxide. Among these, in view of high reaction rate and small amount of cyclic dimer, titanium tetrabutoxide is preferred. The amount of polycondensation catalyst is preferably from 0.03 to 0.1 wt % based on the terephthalic acid diester used.

The resin composition obtained by this first method can have an intrinsic viscosity of approximately from 0.4 to 0.8. The amount of cyclic dimer is usually from 2 to 3 wt % and the amount of BPE is 0.2 wt % or less.

Second is a method of using a terephthalic acid and trimethylene glycol.

More specifically, a terephthalic acid and trimethylene glycol are reacted at a temperature of from 200 to 240° C. to perform ester exchange and thereafter, subjected to a polycondensation reaction at a temperature of from 250 to 290° C., preferably from the same reason as in the first method from 260 to 280° C., under reduced pressure of at least 1 torr or less, preferably 0.5 torr or less, to obtain the objective resin composition. In this case, for the purpose of allowing the ester exchange reaction to smoothly proceed, bis(3-hydroxypropyl) terephthalate as an ester reaction product is preferably added in an amount of from 5 to 50 wt % at the initiation of reaction to uniformly perform the reaction, so that the reaction rate can be increased.

The molar ratio of terephthalic acid to trimethylene glycol as the ester exchange catalyst at the charging is from 1:1.3 to 1:4, preferably from 1:1.5 to 1:2.1. If the trimethylene glycol is less than 1:1.3, the reaction time is extremely prolonged and the resin composition is colored, whereas if the amount of trimethylene glycol exceeds 1:4, the amount of BPE produced exceeds 2 wt %.

A proton liberated from the terephthalic acid acts as the ester exchange catalyst, therefore, an ester exchange catalyst is not necessarily required but in order to increase the reaction rate, an ester exchange catalyst is preferably used. Preferred examples thereof include titanium alkoxide represented by titanium tetrabutoxide and titanium tetraisopropoxide. The amount of ester exchange catalyst is preferably from 0.02 to 0.1 wt % based on the terephthalic acid used.

A polycondensation catalyst must be necessarily used. Examples thereof include titanium alkoxide represented by titanium butoxide and titanium tetraisopropoxide, antimony acetate and antimony trioxide. Among these, in view of high reaction rate and small amount of cyclic dimer, titanium tetrabutoxide is preferred. The amount of polycondensation catalyst is preferably from 0.03 to 0.1 wt % based on the terephthalic acid used.

The resin composition obtained by this second method can have an intrinsic viscosity of approximately from 0.4 to 0.8. The amount of cyclic dimer is usually from 2 to 3 wt % and the amount of BPE is from 0.5 to 2 wt %. Accordingly, in order to increase the dyeability of fiber obtained, a terephthalic acid is preferably used as a starting material.

In either of these two methods, the phosphorus compound, the cobalt compound or the hindered phenol-base antioxidant and the whitening agent for use in the present invention may be added at any stage during the polymerization and may be added at once or in parts. However, the phosphorus compound is preferably added after the completion of ester exchange reaction because the ester exchange reaction is not inhibited and the discoloration is prevented to a highest extent. In the case where the temperature of the contents during the polymerization exceeds the boiling point of phosphorus compound used, the phosphorus compound evaporates if added as it is, therefore, addition in a predetermined amount cannot be attained. In such a case, a method of once dissolving the phosphorus compound in trimethylene glycol at a temperature of at least 50° C. or more and once reacting it with trimethylene glycol to increase the boiling point is preferably used. By using such a method, a desired amount of phosphorus element may be contained in the resin composition. The cobalt compound can act also as an ester exchange catalyst, therefore, is preferably added before the ester exchange reaction.

The resin composition obtained by these two methods can satisfy the object of the present invention, however, it is difficult to elevate the intrinsic viscosity of resin composition obtained to 0.81 or more. For example, if the reaction temperature is increased to elevate the intrinsic viscosity, thermal decomposition occurs and the viscosity does not rise in some cases. To attain an intrinsic viscosity of 0.81 or more, a method of using solid phase polymerization is preferably used. When the solid phase polymerization is used, the intrinsic viscosity can be elevated up to 2.0. The solid phase polymerization may be performed using a resin composition formed into a chip, powder, fiber, plate or block shape, at a temperature of from 170 to 220° C. for approximately from 3 to 48 hours in the presence of an inert gas such as nitrogen or argon or under reduced pressure of 100 torr or less, preferably 10 torr or less. The solid phase polymerization is advantageous in that the intrinsic viscosity can be elevated and also in that the cyclic dimer escapes from the resin composition during the solid phase polymerization because the cyclic dimer has sublimability, and thereby the amount of cyclic dimer can be reduced to 2 wt % or less, preferably 1 wt % or less. In this case, even a resin composition having an amount of cyclic dimer in excess of 3 wt % before the solid phase polymerization can be reduced in the amount of cyclic dimer to 3 wt % or less after the solid phase polymerization.

Accordingly, by combining melt polymerization and solid phase polymerization, a most preferred polyester resin composition of the present invention can be produced.

MODE FOR CARRYING OUT THE INVENTION

The present invention is described in greater detail below by referring to the Examples, however, needless to say, the present invention should not be construed as being limited to these Examples. In the Examples, the main measurement values were obtained by the following measuring methods.

(1) Measurement of Intrinsic Viscosity of Polyester Resin Composition

The intrinsic viscosity [η] was measured at 35° C. with o-chlorophenol using an Ostwald's viscometer and obtained according to the following formula by extrapolating the ratio ηsp/C of the specific viscosity ηsp to the concentration C (g/100 ml) with the concentration of 0:

$$[\eta] = \lim(\eta sp/C) C \rightarrow 0$$

(2) Measurement of Amounts of Phosphorus Element and Cobalt Element in Polyester Resin Composition, Amount of Metal Element used as Polycondensation Catalyst, and X Value The amounts of phosphorus element, cobalt element and a metal element used as polycondensation catalyst, such as titanium, were measured using a high frequency plasma emission spectrochemical analyzer (Model IRIS-AP, manufactured by Thermo Jourel Asch).

The sample was prepared as follows. To a Erlenmeyer flask, 0.5 g of resin composition and 15 ml of concentrated sulfuric acid were added and decomposed on a hot plate at 150° C. for 3 hours and on a hot plate at 350° C. for 2 hours. After the cooling, 5 ml of aqueous hydrogen peroxide was added to perform decomposition by oxidation. Subsequently, the resulting solution was concentrated to 5 ml and thereto 5 ml of an aqueous solution of concentrated hydrochloric acid/water (1:1) and further 40 ml of water were added to prepare a sample.

The X value indicates the ratio of the molar number of phosphorus element of the phosphorus compound to the molar number of metal element used as the polycondensation catalyst (=molar number of phosphorus element of phosphorus compound/molar number of metal element used as polycondensation catalyst).

(3) Measurement of Coloring Degree (Yellow Tinting) of Polyester Resin Composition The resin composition was refined and subjected to color measurement using a color computer (manufactured by Suga Shikenki K.K.). The b value indicates yellow or blue tinting. The larger from 0 the numerical value is, the higher the yellow tinting is, and the smaller from 0 the numerical value is, the higher the blue tinting is. A numerical value closer to 0 indicates the colorlessness.

(4) Measurement of Melting Point of Polyester Resin Composition

The melting point was measured at a temperature-rising rate of 20° C./min in a nitrogen stream flowing at 100 ml/min using DSC manufactured by Seiko Electric Corporation. A peak value at the peak of melting was used as the melting point.

(5) Measurement of Amount of Cyclic Dimer in Polyester Resin Composition The resin composition was weighed to 0.3 g, added to a mixture containing 5 ml of hexafluoroisopropanol and 5 ml of chloroform, and dissolved at room temperature. After the complete dissolution, 5 ml of chloroform was added and further about 80 ml of acetonitrile was added. At this time, insoluble matters precipitated and after separating the insoluble matters by filtration, the filtrate was wholly transferred to a 300 ml-volume flask. To the flask, acetonitrile was again added to obtain a transparent solution in a total amount of 200 ml.

This solution was analyzed using a high-performance liquid chromatography to measure the amount of cyclic dimer. The column used was μBondasphere 15μ C-18-100A 3.9×190 mm (produced by Waters) and the moving bed used was water/acetonitrile (volume ratio: 30/70). The detection was performed using ultraviolet light at a wavelength of 242 nm, at a temperature of 45° C. and at a flow rate of 1.5 ml/min.

(6) Quantification of BPE 2 g of refined resin composition was added to 25 ml of a methanol solution of 2 N potassium hydroxide and the resulting solution was subjected to solvolysis under reflux over 4 hours. This methanol solution was quantified by gas chromatography.

The column used was DURABOND DB-WAX 0.25 mm×30 m (0.25 μm) and the measurement was performed at a temperature-rising rate of 20° C./min from 150° C. to 230° C. while passing helium at 100 ml/min.

(7) Spinning Method and Ratio of Broken Filaments in Yarn

The resin composition was dried, melted at an extrusion temperature of 270° C. and melt-spun at a spinning rate of 1,500 m/min through a spinneret (36 orifices, 0.23 mm). The undrawn yarn was taken up and then passed through a hot plate at 55° C. and then a hot plate at 140° C. to perform 2.4 times drawing. The size/number of filaments of fiber obtained was set to 50 d/36 f. For determining the ratio of broken filaments in yarn, 1,000 bundles of 500-g pirn were sampled, the number of bundles having broken filaments coming out to the surface was counted, the number was divided by 1,000, the numerical value obtained was multiplied by 100, and the resulting numerical value was used as the ratio of broken filaments in yarn.

(8) Measurement of Melt-Viscosity Retention of Polyester Resin Composition

The intrinsic viscosity of undrawn yarn obtained by the method of (7) was divided by the intrinsic viscosity of resin composition used, the numerical value obtained was multiplied by 100, and the resulting numerical value was used as the melt-viscosity retention.

(9) Measurement of Mechanical Properties (Tenacity, Elongation, Modulus)

Each mechanical property of fiber was measured according to JIS-L-1013.

(10) Measurement of Elastic Recovery

A fiber was fixed to a tensile tester with a chuck-to-chuck distance of 20 cm, elongated at a pulling rate of 20 cm/min to an elongation of 20%, then allowed to stand for 1 minute, and thereafter shrunk at the same rate. In this way, a stress-strain curve was configured. The elongation when the stress became 0 during the shrinking was defined as a residual elongation (A). The elastic recovery was obtained according to the following formula:

$$\text{Elastic Recovery} = (20-A)/20 \times 100(\%)$$

(11) Measurement of Birefringence

The birefringence was determined from retardation observed on the surface of fiber using an optical microscope and a compensator described in Seni Binran—Genryo Hen (Handbook of Fiber; Raw Material Eddition, 5th ed., Maruzen 1978).

EXAMPLE 1

To a reactor, 25,000 parts of dimethyl terephthalate (hereinafter simply referred to as "DMT"), 21,553 parts by weight of trimethylene glycol and 0.1 wt %/DMT (this unit indicates wt % based on DMT) of a 7:1 mixture containing calcium acetate and cobalt acetate tetrahydrate were charged and then subjected to ester exchange reaction under heating at a heater temperature of 240° C. for 4 hours under normal pressure. To the ester exchange reaction product, 0.1 wt %/DMT of titanium tetrabutoxide and 0.05 wt %/DMT of trimethyl phosphate were added and polycondensed at 270° C. and 0.2 torr for 3 hours while stirring to obtain a resin composition. The resin composition obtained had an intrinsic viscosity of 0.70, a poly(trimethylene terephthalate) amount of 97 wt %, a BPE amount of 0.07 wt %, a cyclic dimer amount of 2.4 wt %, a phosphorus element amount of 105 ppm and a cobalt element amount of 30 ppm. This resin composition was melt spun and drawn. The fiber obtained had excellent whiteness, a low broken filament ratio and small reduction in the viscosity at the stage of spinning. The components of this resin composition, the viscosity retention at the melting, and the capability of fiber obtained by the spinning and drawing of the resin composition are shown in Table 1.

EXAMPLE 2 and 3

The experiment of Example 1 was repeated by varying the amount of cobalt acetate or trimethyl phosphate. The physical properties of the resin compositions obtained are shown in Table 1. The fibers obtained using these resin compositions had excellent whiteness, a low broken filament ratio of 0.2% and small reduction in the viscosity at the stage of spinning.

EXAMPLE 4

An experiment was performed in the same manner as in Example 1 except that a 7:1 mixture of calcium acetate and cobalt acetate tetrahydrate was added in an amount of 0.1 wt % of the theoretical polymer amount as the ester exchange reaction catalyst at the ester exchange reaction and the polymerization temperature and the polymerization time were changed to 250° C. and 2 hours, respectively. The physical properties of the resin composition obtained are shown in Table 1. The fiber obtained using this resin composition had excellent whiteness, a low broken filament ratio and small reduction in the viscosity at the stage of spinning.

EXAMPLE 5

A slurry containing 1,300 parts by weight of terephthalic acid (hereinafter simply referred to as "TPA"), 1,369 parts by weight of trimethylene glycol and 0.01 wt %/TPA of cobalt acetate tetrahydrate was subjected to ester exchange at a heater temperature of 240° C. under ordinary temperature. Thereto, 0.1 wt %/DMT of titanium tetrabutoxide and 0.05 wt %/TPA of trimethyl phosphate were added and polycondensed at 270° C. and 0.2 torr for 3 hours. The physical properties of resin composition obtained are shown in Table 1. The fiber obtained using this resin composition had excellent whiteness, a low broken filament ratio and small reduction in the viscosity at the stage of spinning.

EXAMPLE 6

The experiment of Example 5 was repeated except that cobalt carbonate was used in place of cobalt acetate tetrahydrate, tributyl phosphate was used in place of trimethyl phosphate and the amounts added were changed. The physical properties of the resin composition obtained are shown in Table 1. The fiber obtained using the resin composition had excellent whiteness, a low broken filament ratio and small reduction in the melt-viscosity.

EXAMPLE 7

The experiment of Example 5 was repeated except that tributyl phosphite was used in place of trimethyl phosphate and cobalt acetate tetrahydrate was not used. The physical properties of the resin composition obtained are shown in Table 1. The fiber obtained using the resin composition had excellent whiteness, a low broken filament ratio and small reduction in the viscosity at the stage of spinning. In this case, the polycondensation reaction took 4.5 hours.

EXAMPLE 8

The resin composition of Example 1 was subjected to solid phase polymerization at 215° C. for 5 hours in a nitrogen stream. The physical properties of the resin composition obtained are shown in Table 1. In this resin composition, the amount of cyclic dimer was greatly reduced. Furthermore, by virtue of increase in the viscosity, the fiber obtained had high tenacity.

Reference Example 1

A single end fed knitted cloth (28G, plain stitch) of a fiber obtained in Example 1 was heat set at 180° C. for 30 seconds and thereafter dyed at 98° C. and a pH of 5 for 1 hour at a liquor to goods ratio of 1:30 using 4% wt of Dianicks Black HG-FS (disperse dye, produced by Dystar Japan) in the presence of 1 g/l of Disper TL (produced by Meisei Chemical Works Ltd.). The dye exhaustion was 53%. The dyed product was placed in a fadeometer at 63° C. for 27 hours to evaluate the color fastness against light. As a result, the color did not fade. The same test was performed using the fiber obtained in Example 4, then, the dye exhaustion was 84% and in the test of color fastness to light, the color did not fade.

Comparative Example 1

The experiment of Example 1 was repeated except that 0.1 wt %/DMT of titanium tetrabutoxide and 0.1 wt %/DMT of titanium tetrabutoxide were used as the ester exchange catalysts and trimethyl phosphate and cobalt acetate were not used. The physical properties of the resin composition obtained are shown in Table 1. This resin composition was severely colored and had low melt stability. As a result, only a fiber having low tenacity could be obtained.

Comparative Example 2

The experiment of Example 1 was repeated except that the polycondensation temperature was reduced to 250° C. and trimethyl phosphite and cobalt acetate were not used. The physical properties of the resin composition obtained are shown in Table 1. This resin composition was severely discolored and had low melt stability. As a result, only a fiber having low tenacity could be obtained. In this resin composition, the amount of cyclic dimer exceeded 3 wt %, therefore, a high broken filament ratio resulted.

Comparative Example 3

The resin composition obtained in Comparative Example 1 was subjected to solid phase polymerization at 215° C. for 5 hours in a nitrogen stream to obtain a resin composition having an intrinsic viscosity of 1.1. This resin composition contained 98 wt % of poly(trimethylene terephthalate). The amount of cyclic dimer was 1.0 wt % and the broken filament ratio was as low as 0.1.

However, due to absence of phosphorus compound, when this resin composition was spun, the viscosity retention was reduced to 64% and the fiber obtained was poor in the mechanical properties such that the tenacity was 3.5 g/d and the elongation was 35%.

Comparative Example 4

An experiment was performed by increasing the amount of trimethylene glycol used to 8 times in Example 1. The resin composition obtained had a BPE amount of 2.1 wt %. This resin composition was a resin composition containing 96 wt % of poly(trimethylene terephthalate).

Using this resin composition, a fiber was obtained, dyed in the same manner as in Reference Example 1, and subjected to a color fastness to light test by a fadeometer. As a result, the dye exhaustion was 90% but the color of the dyed product faded.

Comparative Example 5

A slurry containing 1,300 parts by weight of TPA, 1,369 parts by weight of trimethylene glycol and 0.01 wt %/TPA of cobalt acetate was subjected to ester exchange at a heater temperature of 240° C. under atomosphric pressure. Thereto, 0.1 wt %/DMT of butyltin acid and 0.05 wt %/TPA tridecyl phosphite were added and polycondensed at 270° C. and 0.2 torr for 4 hours.

The resin composition obtained was a resin composition containing 96 wt % of poly(trimethylene terephthalate) and colored yellow as having a b value of 14. The amount of cyclic dimer was 3.4 wt %. The fiber obtained using this resin composition was colored in yellow and due to the presence of a large amount of cyclic dimer, had a high broken filament ratio.

EXAMPLE 9

The experiment of Example 6 was repeated except that 0.07 wt %/TPA of pentaerythritol-tetrakis[3-(3,5-di-tert-butyl-4-hydroxyphenyl)propionate] (Irganox 1010, produced by Ciba Specialty Chemical) was added after the completion of ester exchange reaction. The resin composition obtained was a resin composition containing 97 wt % of poly(trimethylene terephthalate) and the viscosity retention was improved to 98%.

This resin composition was cut into a 3-mm square and heated in air at 130° C. for 6 hours, and acrolein and allyl alcohol produced were trapped in a dry ice-methanol bath. At this time, the amounts of acrolein and allyl alcohol produced were 0.15 mg and 0.20 mg, respectively, per 1 hr per 1 g of the resin composition. In the case of resin composition of Example 1, the amounts of acrolein and allyl alcohol produced were 0.51 mg and 0.82 mg, respectively.

Comparative Example 6

The experiment of Example 1 was repeated except that 0.05 wt % of tris(2,4-di-t-butylphenyl)phosphite was used in place of 0.05 wt % of trimethyl phosphate. The resin composition obtained had an intrinsic viscosity of 0.74, contained 96 wt % of poly(trimethylene terephthalate) and had a phosphorus element amount of 5 ppm, a cyclic dimer amount of 3.1 wt % and a BPE amount of 0.07 wt %. This resin composition was spun, then the viscosity retention was 84% and, the fiber obtained had a tenacity of 3.8 g/d, and an elongation of 33%.

TABLE 1

Components of Polyester Resin Composition and Physical Properties of Fibers Thereof

| | Amount of Poly(trimethylene terephthalate) wt % | Amount of Phosphorus Element ppm | Amount of Cobalt Element ppm | X Value | Intrinsic Viscosity dl/g | b Value | Melting Point ° C. | Amount of Cyclic Dimer wt % |
|---|---|---|---|---|---|---|---|---|
| Example | | | | | | | | |
| 1 | 97 | 105 | 27 | 1.2 | 0.70 | −2 | 233 | 2.4 |
| 2 | 97 | 105 | 0 | 0.7 | 0.70 | 6.2 | 233 | 1.7 |
| 3 | 97 | 51 | 0 | 0.51 | 0.71 | 7.1 | 232 | 2.2 |
| 4 | 97 | 111 | 27 | 1.2 | 0.62 | 0.7 | 232 | 2.1 |
| 5 | 97 | 89 | 19 | 1.2 | 0.79 | 4.2 | 230 | 2.1 |
| 6 | 97 | 62 | 100 | 2.1 | 0.78 | 1.0 | 230 | 2.2 |
| 7 | 97 | 100 | 0 | 1.88 | 0.68 | 4.2 | 230 | 2.1 |
| 8 | 98 | 105 | 30 | 1.2 | 1.10 | 0.1 | 232 | 0.9 |
| 9 | 97 | 61 | 95 | 2.1 | 0.80 | 1.0 | 230 | 2.4 |
| Comparative Example | | | | | | | | |
| 1 | 97 | 0 | 0 | 0 | 0.71 | 12.2 | 232 | 2.4 |
| 2 | 95 | 0 | 0 | 0 | 0.71 | 13.2 | 232 | 3.6 |

| | Amount of BPE wt % | Birefringence | Tenacity g/d | Elongation % | Modulus g/d | Elastic Recovery % | Viscosity Retention % | Broken Filament Ratio % |
|---|---|---|---|---|---|---|---|---|
| Example | | | | | | | | |
| 1 | 0.07 | 0.075 | 4.6 | 35 | 23 | 90 | 98 | 0.2 |
| 2 | 0.07 | 0.074 | 4.6 | 32 | 25 | 90 | 97 | 0.2 |
| 3 | 0.06 | 0.073 | 4.5 | 36 | 23 | 88 | 96 | 0.2 |
| 4 | 0.06 | 0.071 | 4.7 | 32 | 25 | 89 | 97 | 0.4 |
| 5 | 0.68 | 0.065 | 4.6 | 35 | 23 | 88 | 98 | 0.2 |
| 6 | 0.76 | 0.064 | 4.4 | 31 | 25 | 87 | 96 | 0.3 |
| 7 | 0.66 | 0.063 | 4.6 | 32 | 26 | 89 | 98 | 0.2 |
| 8 | 0.68 | 0.071 | 5.1 | 33 | 26 | 88 | 92 | 0.1 |
| 9 | 0.80 | 0.070 | 4.3 | 34 | 25 | 89 | 98 | 0.2 |

TABLE 1-continued

Components of Polyester Resin Composition and Physical Properties of Fibers Thereof

| Comparative Example | | | | | | | | |
|---|---|---|---|---|---|---|---|---|
| 1 | 0.08 | 0.065 | 3.9 | 33 | 25 | 90 | 85 | 0.2 |
| 2 | 0.08 | 0.068 | 3.8 | 35 | 25 | 90 | 87 | 1.1 |

INDUSTRIAL APPLICABILITY

According to the design of polyester resin composition of the present invention, poly(trimethylene terephthalate) is prevented from a reduction in polymerization degree and a resin composition having sufficiently high melt stability can be prepared. By using this polyester resin composition of the present invention, the polymer can be melt-spun while preventing a reduction in the polymerization degree, so that a poly(trimethylene terephthalate) fiber having high tenacity and excellent whiteness can be stably obtained.

The poly(trimethylene terephthalate)-based fiber obtained by using the polyester resin composition of the present invention has good workability, therefore, this is a fiber material suitable for clothing represented by inner wear, outer wear, sportswear, swimming suit, panty stocking and lining. This fiber can also be used as a fiber material for use in materials such as carpet, lining cloth and flocked fabric. Furthermore, the resin composition can also be suitably used in the extrusion molding of film sheet and the like.

What is claimed is:

1. A polyester resin composition having an intrinsic viscosity of from 0.4 to 2 and satisfying the following conditions (1) to (4):
   (1) poly(trimethylene terephthalate) occupies 90 wt % or more;
   (2) a phosphorus compound corresponding to from 10 to 250 ppm in terms of the amount of phosphorus element is contained;
   (3) 3 wt % or less of cyclic dimer is contained; and
   (4) 2 wt % or less of bis(3-hydroxypropyl)ether is contained and copolymerized with poly(trimethylene terephthalate).

2. The polyester resin composition as claimed in claim 1, wherein the ratio of the molar number of phosphorus element in the phosphorus compound to the molar number of metal element used as the polycondensation catalyst is from 0.4 to 3.

3. The polyester resin composition as claimed in claim 1 or 2, wherein the phosphorus compound is a phosphate represented by the formula; $O=P(OR_1)(OR_2)(OR_3)$, or a phosphite represented by the formula: $P(OR_4)(OR_5)(OR_6)$ (wherein $R_1$, $R_2$, $R_3$, $R_4$, $R_5$ and $R_6$ which may be the same or different, each is selected from the group consisting of hydrogen atom, an organic group having from 1 to 8 carbon atoms, an alkali metal and an alkaline earth metal).

4. The polyester resin composition as claimed in claim 1, wherein a cobalt compound corresponding to from 5 to 200 ppm in terms of the amount of cobalt element is contained.

5. The polyester resin composition as claimed in claim 4, wherein the cobalt compound is at least one selected from the group consisting of cobalt acetate, cobalt formate, cobalt carbonate, cobalt acetyl acetonate and cobalt sulfate.

6. The polyester resin composition as claimed in claim 1, wherein the amount of bis(3-hydroxypropyl)ether copolymerized is from 0.4 to 1 wt %.

7. The polyester resin composition as claimed in claim 1, which contains a hindered phenol-base antioxidant in an amount of 1 wt % or less.

8. The polyester resin composition as claimed in claim 1, wherein the intrinsic viscosity is from 0.81 to 2 and the amount of cyclic dimer is 2 wt % or less.

* * * * *